INVENTOR.
ROBERT G. HEDTKE
BY Carlsen and Carlsen
ATTORNEYS

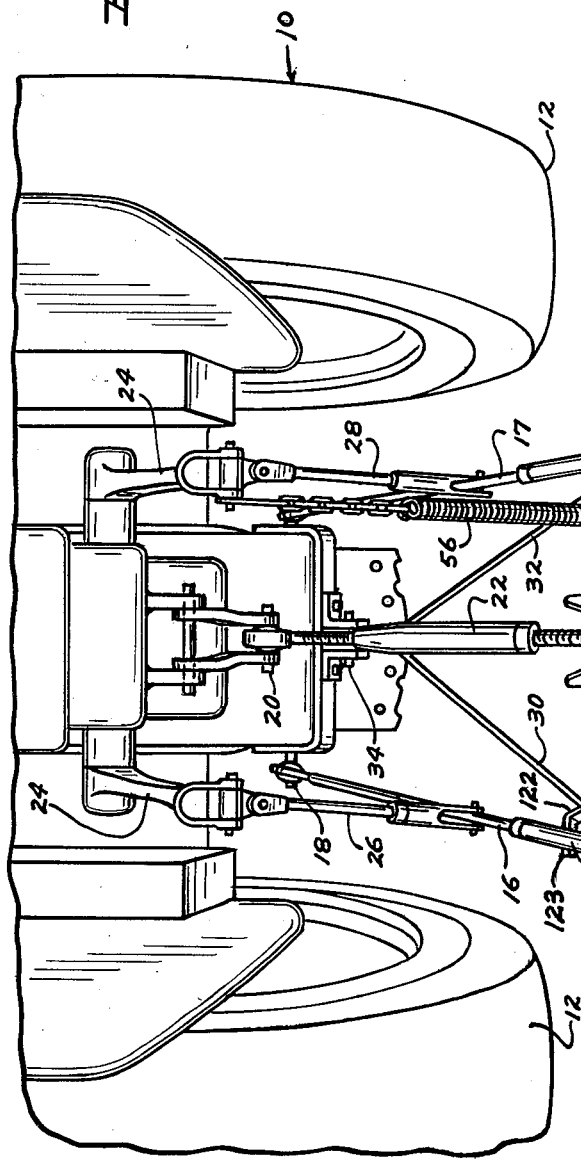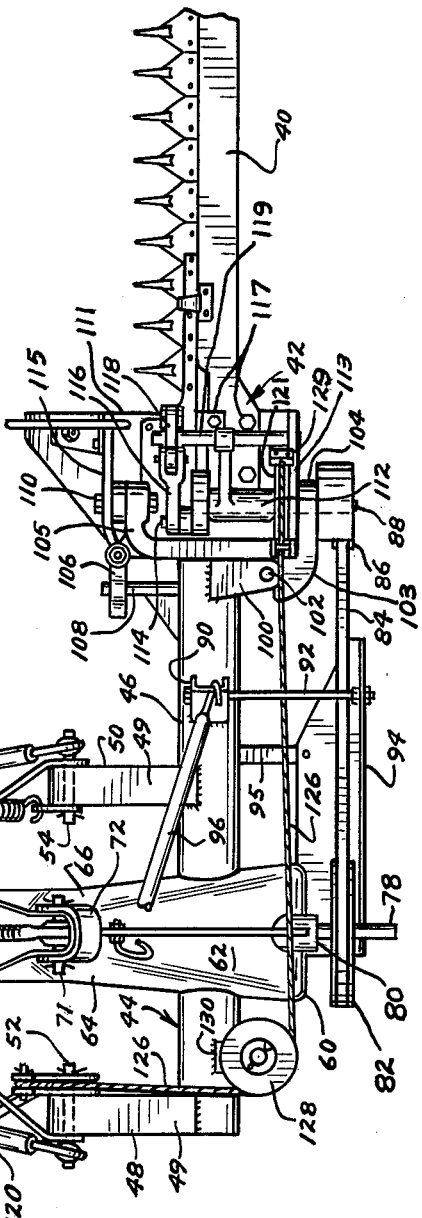

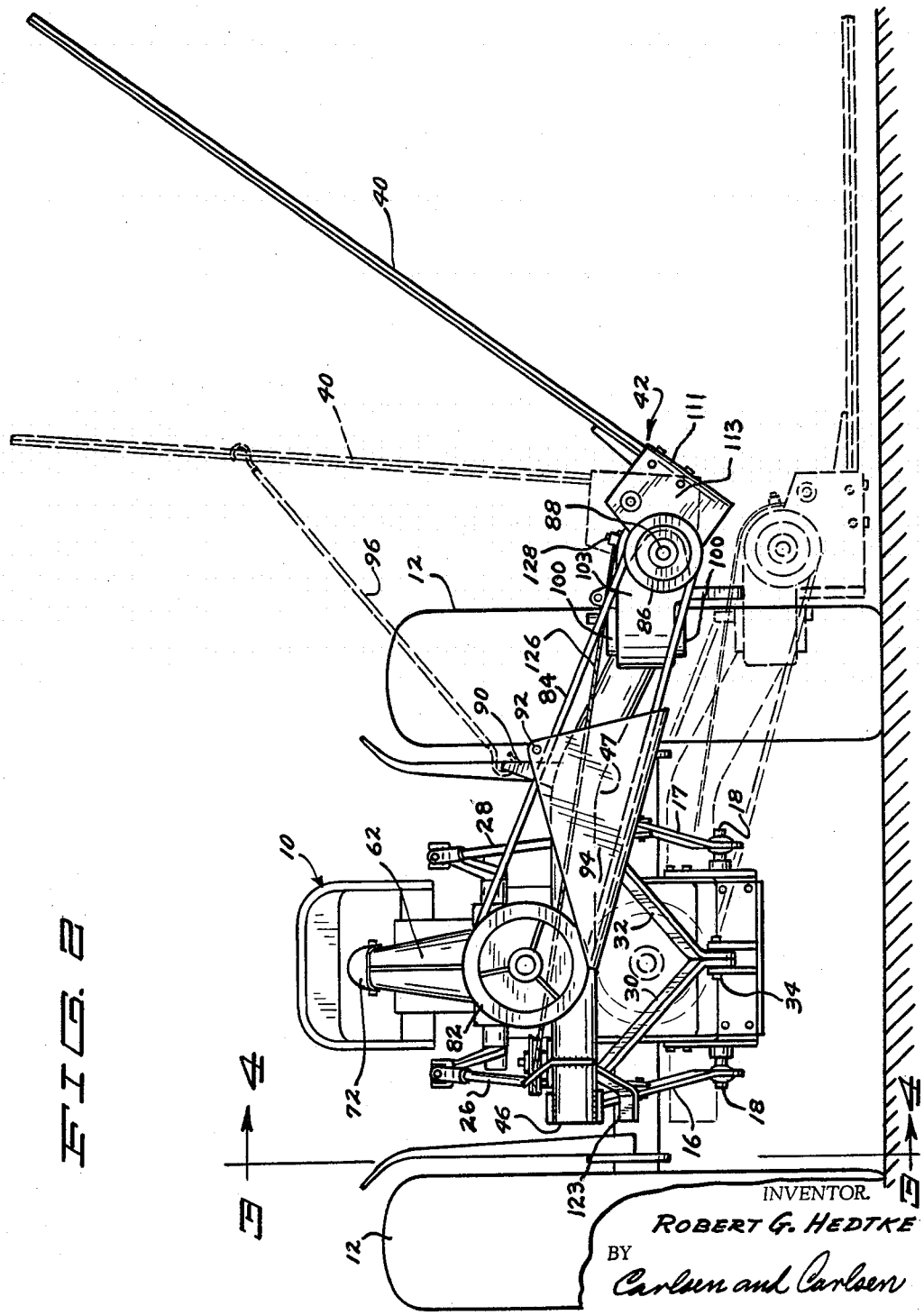

United States Patent Office 3,109,272
Patented Nov. 5, 1963

3,109,272
TRACTOR CARRIED MOWER
Robert G. Hedtke, Excelsior, Minn., assignor, by mesne assignments, to Minneapolis-Moline, Inc., Hopkins, Minn., a corporation of Delaware
Filed Dec. 27, 1961, Ser. No. 162,410
1 Claim. (Cl. 56—25)

This invention relates to farm implements and more particularly to a mower which may be secured to a tractor having a vertically pivotable three point hitch.

A number of mower constructions have been previously used with tractors employing vertically pivotable draw bars commonly referred to as three point hitch. According to the prior art, the mower frame is secured upon the rearward ends of these draw bars and a suitable drive unit provided on the tractor is used to lift the entire mower from the ground in order to enable the mower to be transported at relatively high speed on highways or between the areas where the mower is to be used.

The prior mower constructions, however, have been subject to a number of disadvantages. One important disadvantage is that the mower frame assembly connected to the rearward ends of the draw bars has been relatively complicated in construction. The frame assembly of some of these mowers employs as many as a dozen major parts, each of which must be separately fabricated and then suitably joined together all at a considerable cost. Furthermore, many of the prior mowers are not provided with a safety guard for enclosing the drive shaft which extends between the tractor and the mower and when such a guard member is needed, an additional component part is required.

According to the present invention, on the other hand, the lower frame comprises only three major parts. Moreover, a drive shaft guard or cover is formed integrally with the mower frame thus protecting moving parts to help avoid accidents but without increasing the total number of parts required for the frame assembly as will be explained more fully hereinbelow. The mower frame assembly of the present invention is therefore relatively uncomplicated and consequently less expensive to manufacture.

There have been several previous proposals for a lifting means including a cable for swinging the mower bar upwardly from a horizontal operative position to an inoperative position. These previous devices, however, have been for the most part unduly complicated and have required the placement of component parts such as pulleys in undesirable locations causing the lifting cable to be spaced at a considerable distance upwardly and rearwardly from the lower frame thus enabling the cable to become easily fouled by obstructions. Moreover these lifting devices present a poor appearance. The present invention provides a more compact lifting mechanism and presents a more attractive appearance. Moreover, the mower bar lifting cable is much less likely to become fouled by obstructions.

Thus, one important feature of this invention is the provision of an economical and simply constructed mower frame assembly for a mower of the type carried by a tractor. According to the present invention the mower frame assembly comprises a rigid horizontally disposed tubular member including a pair of forwardly extending mounting brackets adapted to be connected at their forward ends to the rearward ends of the two draw bars and an upwardly extending member which serves both as a means for connecting an upper draw bar to the mower and also as a drive shaft guard or cover. A mower bar is pivotally connected to one end of the tubular frame member for rearward movement about a vertical axis so as to enable the mower bar to be deflected in the event an obstruction is encountered. The mower bar is also mounted for pivotal movement about a horizontal axis with respect to the mower frame member so that it can be elevated as required to clear obstructions and also for rapid transportation between various locations where the mower is to be used.

Another important feature of the present invention resides in the provision of a bell crank mounted pivotally upon the forward end of one of the mower frame bracket members and including a normally horizontally positioned arm adapted to cooperate with one of the draw bars and a vertical arm to which the end of a mower bar lifting cable is attached. The center portion of the cable is entrained over a pulley mounted upon the tubular frame member and the other end thereof is connected near the base of the mower bar so that tension on the cable will elevate the free end of the mower bar.

It was found that by connecting the mower bar lifting cable to the upward end of the vertically disposed arm of the bell crank that the lifting mechanism can be made considerably more compact in construction and will present a greatly improved visual appearance as well as reducing the opportunity for foreign objects from becoming entangled in the lifting cable.

It is thus one object of the present invention to provide an improved mower frame assembly suitable for use with a tractor having a plurality of vertically pivotable draw bars at the rearward end thereof.

It is a further object of the present invention to provide an improved mower assembly which has been reduced in complexity through the elimination of a number of parts.

It is yet another object of this invention to provide an improved mower construction of the type described including a means for connecting the mower to the rearward end of a plurality of vertically pivotable draw bars and an improved means for elevating the mower bar responsive to the upward movement of the draw bars.

It is still another object of this invention to provide an improved mower of the type described with a cable or the like for lifting the draw bar when the mower is raised and wherein the cable is placed in an out of the way position adjacent to the mower frame assembly thereby providing a more compact construction and a better visual appearance as well as reducing the opportunity for the cable to become fouled by obstructions.

It is yet another object of the present invention to provide an improved mower of the type described with a cable or the like for lifting the mower bar when the mower is raised and including a bell crank pivotally connected to the mower with a horizontally disposed arm to cooperate with the one of the draw bars and a vertically disposed arm to which one end of the mower bar lifting cable is connected.

These and other more detailed and specific objects will be disclosed in the course of the following specification, reference being had to the accompanying drawings, in which—

FIG. 1 is a perspective view partly broken away of the preferred form of my invention as seen from above as it appears when attached to a tractor.

FIG. 2 is a rear elevational view of the apparatus of FIG. 1 showing the mower in the elevated position in solid lines and in a lowered position in dotted lines.

Figure 3:
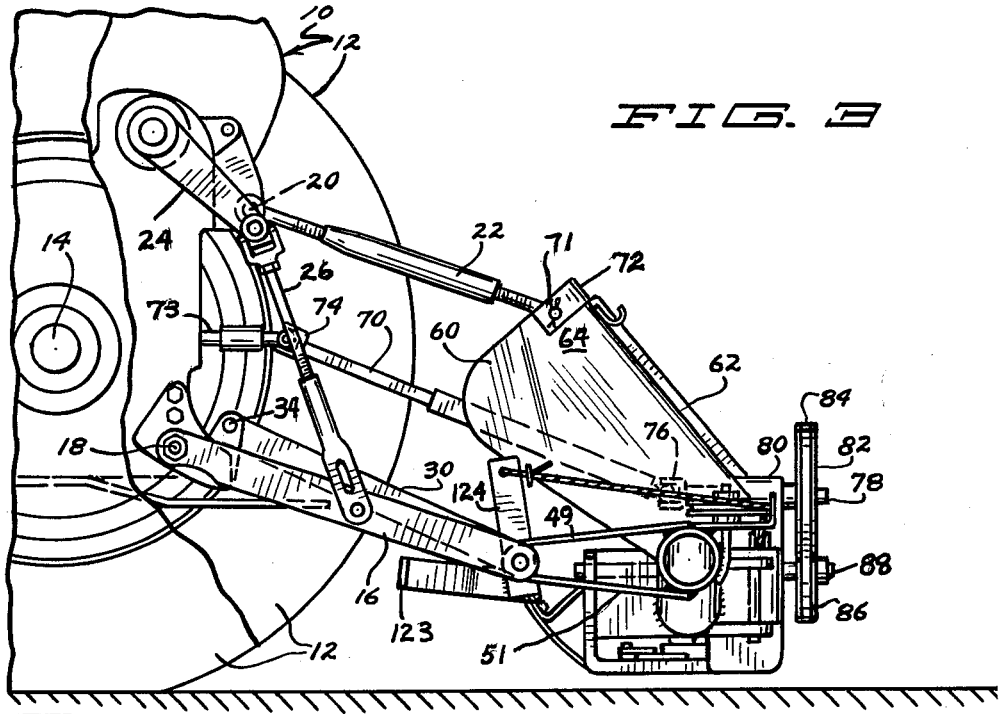
FIG. 3 is a vertical elevational view partly broken away taken on line 3—3 of FIG. 2 with the mower in the lower or operative position.

Referring now to the drawings, there is shown in the figures, a tractor 10 including a pair of rear wheels 12 connected to the ends of a rear axle 14. A pair of spaced apart links or draw bars 16 and 17 are pivotally connected at their forward ends to the rear of the tractor at 18 for up and down movement about a horizontal axis. Pivotally connected to the tractor 10 upon a pin 20 is a third draw bar 22 positioned above the two draw bars 16 and 17. The draw bars 16, 17 and 22 can be raised and lowered simultaneously through the action of a pair of power lifting levers 24 which are operatively connected to the lower draw bars 16 and 17 by means of links 26 and 28 respectively. A pair of stabilizer members 30 and 32 are operatively associated at their rearward ends with the rearward ends of the draw bars 16 and 17 respectively and connected at their forward ends by means of a pivot pin 34 to the rearward end of the tractor 10. The stabilizers 30 and 32 provide added rigidity for the draw bars and also help to maintain the proper spacing between the rearward ends of the draw bars. Since draw bars of the general type described and their actuating mechanism is well known, they will not be described in further detail herein.

The mower, according to the present invention, comprises three major parts. A mower bar indicated generally at 40, a mower reciprocating mechanism 42 at the base of the mower bar 40 and a mower frame assembly 44.

Figure 4:
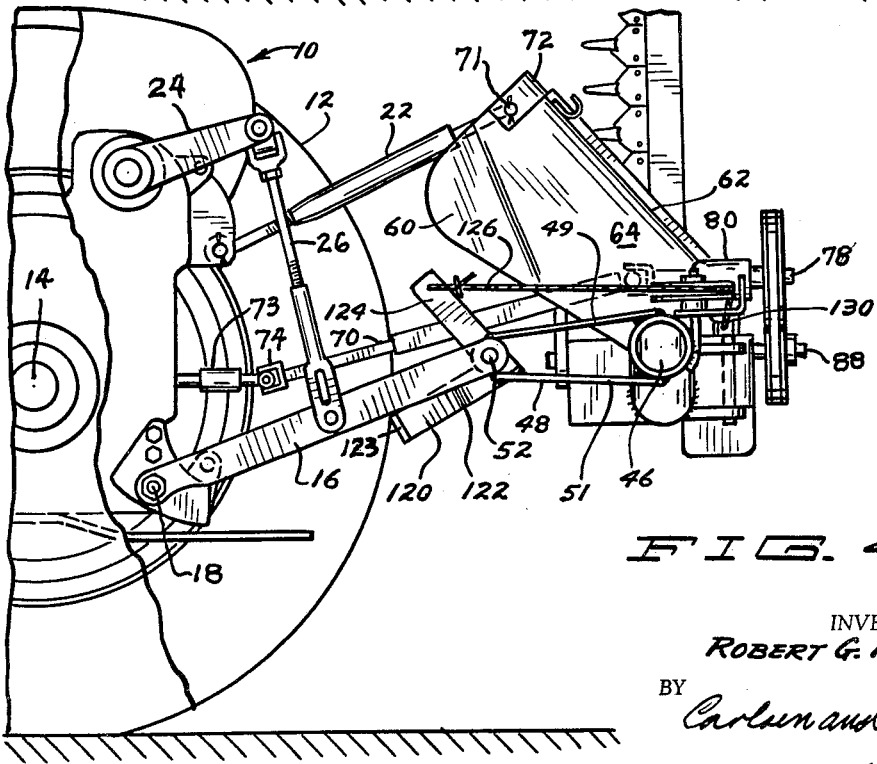
FIG. 4 is a view similar to FIG. 3 but showing the mower in the raised position.

The mower frame assembly 44 comprises a rigid main frame assembly including a horizontally disposed tubular member 46. A portion of the tubular frame member 46 adjacent to the cutter bar drive mechanism 42 is bent downwardly at 47 as best seen in FIG. 2. Extending forwardly from the tubular member 46 and positioned in a horizontal plane are a pair of transversely spaced apart brackets 48 and 50. The brackets 48 and 50 are secured rigidly at their rearward ends to the member 46 by any convenient means as welding. The forward ends of the brackets 48 and 50 respectively are provided with coaxial transversely extending horizontally disposed pins 52 and 54 upon which the rearward ends of the draw bars 16 and 17 respectively are mounted. The brackets 48 and 50 can conveniently be formed from sheet metal of a suitable gauge which has been bent at its center so as to have a generally U-shape in vertical section as best seen in FIGS. 3 and 4 and each includes an upper and a lower portion 49 and 51 respectively. Connected between the pin 54 and the lever 24 there can be provided a resilient means such as helical spring 56 for yieldably biasing the mower upwardly.

Secured rigidly to the tubular member 46 and extending upwardly and forwardly therefrom is a structural guard member 60. The guard member 60 is preferably welded at its lower end to the upper surface of the tubular member 46 and includes an inclined rear wall 62 and a pair of vertically disposed spaced apart side walls 64 and 66. As can be seen in vertical section the guard 60 is generally U-shaped in configuration. The guard 60 extends over the top and around the sides of a drive shaft 70 connected between the tractor 10 and the mower, thereby serving as a protective enclosure for the drive shaft. The forward end of the drive shaft 70 is coupled by means of a universal joint 74 to a conventional tractor power take off 73 best seen in FIGS. 3 and 4.

At the upper end of the guard 60 there is provided a horizontally disposed pivot pin 71 to which the rearward end of the draw bar 22 is secured. The pivot pin 71 extends between the vertical side walls 64 and 66 and the rearward end of the draw bar 22 is secured to the pivot pin between the side walls. If desired, a reinforcing collar 72 can be secured to the upper end of the guard 60 between the openings adapted to receive the ends of the pin 71.

As can be best seen in FIG. 1, the rearward end of the guard 60 projects rearwardly of the tubular frame member 46. Affixed to the rearward end of the guard 60 is a journal member 80 suitably bored to receive a horizontally disposed shaft 78 which is coupled by means of a universal joint 76 at its forward end to the drive shaft 70 and is provided at its rearward end with a pulley 82. Entrained over the pulley 82 is a drive belt 84. Drive belt 84 is also entrained over a pulley 86 which serves to drive the mower reciprocating mechanism 42 as will be more fully described hereinbelow.

Suitably affixed to the upper surface of the frame member 46 between the guard 60 and the reciprocating mechanism 42, there is provided bracket 90. Extending rearwardly from the bracket 90 is a support rod 92 which has connected to its rearward end a guard housing 94 for enclosing the rearward and lower aspects of the drive belt 84. The lower end of the guard 94 can be suitably supported by a bracket 95 connected at its forward end to the lower surface of the frame member 46. The bracket 90 can also support one end of a hook 96 used for retaining the cutter bar 40 in a vertical position as best seen in FIG. 2.

Extending rearwardly from the end of the tube 46 adjacent the reciprocating mechanism 42 are a pair of vertically spaced apart support members 100 best seen in FIGS. 1 and 2. A pivot pin 102 extends between these supports and a portion of a yoke member 103 is pivotally connected upon the pin 102 between the members 100. The yoke member 103 is generally C-shaped in configuration and includes a pair of parallel legs 104 and 105 which are bored coaxially to receive a pivot pin 110 and a crankshaft 88 respectively. The leg 105 is also provided with a lateral extension which includes a spring loaded latch 106 releasably connected to a pin 108 which is rigidly connected to the frame member 46. As can be best seen in FIG. 1, pivotal connection between the frame member 103 and frame member 46 on pin 102 and the releasable latch 106 will enable the mower bar 40 and yoke 103 as well as the component parts of the mower reciprocating mechanism to pivot rearwardly in the event that the mower bar is struck by an obstacle on its forward edge thereby reducing the opportunity for breakage of the mower bar during use.

The mower reciprocating mechanism 42 is supported within a frame member 111 which is U-shaped in vertical section and includes a pair of parallel vertical extending legs 113 and 115. Leg 115 is suitably bored to receive the end of pivot pin 110 and the leg 113 is pivotally mounted upon the crankshaft 88. The mower bar 40 is rigidly connected to the frame member 111 by suitable means as, for example, bolts 117. Also rigidly connected to the frame member 111 is a housing 112 through which passes the crankshaft 88. A pulley 121 is rigidly secured to the frame 111 concentric with the crankshaft 88 and housing 112 for purposes hereinafter explained.

To the end of the shaft 88 opposite the pulley 86 is provided a crank 114. Pivotally mounted on the crank 114 is a connecting rod 116 which is connected at its other end to the upper end of rocker 118 which is itself supported upon a center pivot 119 stationarily connected to the frame member 111. The lower end of rocker 118 is pivotally connected to the mower blade. It will thus be apparent that during operation as the pulley 86 is rotated by the belt 84, rotary movement will be imparted to the crank 114 through the crankshaft 88 thereby causing reciprocating movement to be imparted through the rocker arm 118 to the mower blade.

Pivotally mounted upon pin 52 is a bell crank 122 including a generally horizontally disposed lower arm member 120 and a vertically disposed arm member 124. The arm member 120 includes a portion 123 at its ends adapted to engage the lower surface of the draw bar 16. The arm 124 has suitably secured to its upper end an elongated flexible connecting member such as a wire cable 126. Cable 126 extends rearwardly from the bell crank 120 in a horizontal plane and is entrained over a pulley 128 supported upon bracket 130 affixed to the upper surface of the tubular frame element 46. Cable 126 extends from pulley 128 toward the mower bar or to the right as viewed in FIG. 1 and its other end is entrained over a segment of the pulley 121 and is connected thereto by means of a fastener 129.

As can be best seen in FIG. 1 movement of the cable 126 to the left in the figure will cause the pulley 121 and frame member 111 as well as the mower bar 40 to pivot upwardly about a horizontal axis extending between the pivot pin 110 and the crankshaft 88. It can also be clearly seen in the figures that through the use of a bell crank 120, tension exerted upon the cable 126 can be efficiently transmitted over the pulley 128 to the mower bar even though pulley 128 is placed in very close proximity with the frame member 46. This enables the cable to be placed immediately adjacent to the frame 46 and in out of the way position thereby affording a much more compact construction and better visual appearance as well as reducing the possibility for obstructions to be caught in the cable.

The operation of the device will now be described. The mower is first attached to the three point hitch comprising the draw bars 16, 17 and 22 and bars 30 and 32 by placing the rearward ends thereof upon the pins 52 and 54 and 71 respectively. The drive shaft 70 is then pivotally coupled to an engine power take off 73. The tractor is then started and the mowing operation is commenced with the mower positioned as shown in FIG. 3. Rotation of drive shaft 70 is transmitted through the shaft 78 to pulley 82 and through the belt 84 to the crankshaft 88. Rotary movement of the crank 114 will cause a reciprocating movement of the cutting blades as described above.

After a mowing operation is completed, the mower can be elevated to an out of the way position for rapid transportation by raising the rearward ends of the levers 24 which in turn elevate the rearward ends of the draw bars 16 and 17 and 22 and mower frame as best seen in FIG. 4. The vertical spacing of the draw bar 22 above the draw bars 16 and 17 will maintain the mower in a vertical position as it is elevated. It can be seen that the angle between the bracket 48 and the draw bar 16 will change about pivot 52 as the mower is elevated. As this angle changes, the lower edge of the bar 16 will come into engagement with the portion 123 of the crank 120 causing the arm 122 to pivot downwardly or in a counterclockwise direction as viewed in FIGS. 3 and 4. This movement of the crank will exert tension upon the cable 126 causing the cable segment between the pulley 128 and the pulley 121 to move to the left as viewed in the figure thereby causing the mower bar 40 to swing upwardly about an axis extending between the pivot pin 110 and drive shaft 88 to a position best seen in solid lines in FIGS. 2 and 4. The mower can be carried in this position either to avoid obstructions or during the short trip. When it is necessary to transport the mower for relatively long distances, it is preferred that the mower bar 40 is elevated manually to the dotted line position of FIG. 2 and secured in this position by means of the hook 96.

Mowers according to the present invention have been built and tested and it was found by the provision of a bell crank 120 with a cable 126 connected to its upper end that power exerted upon the cable could be transmitted very efficiently to the mower bar and also the cable 126 could be placed in an out of the way position to provide a more compact construction, an improved appearance and also reduced the chances for an obstruction to foul the cable.

The mower frame assembly 44 was found to be rugged in construction, reliable in operation and relatively low in cost. The guard 60 served satisfactorily as a structural member for connecting the rearward end of draw bar 22 to the mower but at the same time provided a satisfactory guard for the drive shaft 70.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In combination with a tractor having a plurality of vertically pivotable draw bars extending rearwardly therefrom and a power take off shaft, a mower comprising; a mower frame assembly including a horizontally disposed tubular frame member, a downwardly bent portion at one end of said frame member, a mower reciprocating mechanism pivotally connected to the free end of said downwardly bent portion for movement about a vertical axis, a mower bar pivotally connected to said mower reciprocating mechanism for pivotal movement about a horizontal axis whereby the free end of said mower bar can be moved between an operative position in a horizontal plane and raised to an inoperative position, a pair of transversely spaced apart horizontally disposed bracket members secured at their rearward ends to the tubular frame member and extending forwardly therefrom, a pivot at the forward end of each of the bracket members for connecting the frame assembly to the rearward ends of said draw bars, a drive shaft rotatably connected at its rearward end to said frame assembly and including a fastening means for securing its forward end to said power take off shaft, a structural guard member secured at its rearward end to the tubular frame member intermediate the mounting brackets, said guard member extending forwardly therefrom and including an elongated top portion and a pair of downwardly extending spaced apart side walls, said guard member being open on the lower aspect thereof, the side and back walls of said guard member defining a cover for said drive shaft, a pivot at the forward end of said structural guard member for securing said member to rearward end of one of said draw bars.

References Cited in the file of this patent
UNITED STATES PATENTS

| | | |
|---|---|---|
| 2,767,539 | Huddle | Oct. 23, 1956 |
| 2,854,803 | Dort | Oct. 7, 1958 |
| 2,984,960 | Wathen et al. | May 23, 1961 |